(12) United States Patent
Garzon

(10) Patent No.: US 10,444,400 B2
(45) Date of Patent: Oct. 15, 2019

(54) TRAY CONVEYOR BAGGAGE HANDLING AND IMAGING SYSTEM

(71) Applicant: Morpho Detection, LLC, Newark, CA (US)

(72) Inventor: Pedro Andres Garzon, Santa Clara, CA (US)

(73) Assignee: Morpho Detection, LLC, Newark, CA (US)

( * ) Notice: Subject to any disclaimer, the term of this patent is extended or adjusted under 35 U.S.C. 154(b) by 138 days.

(21) Appl. No.: 15/436,904

(22) Filed: Feb. 20, 2017

(65) Prior Publication Data
US 2018/0239050 A1 Aug. 23, 2018

(51) Int. Cl.
G01V 5/00 (2006.01)

(52) U.S. Cl.
CPC .......... *G01V 5/0016* (2013.01); *G01V 5/0008* (2013.01)

(58) Field of Classification Search
CPC ............................................... G01N 2223/643
See application file for complete search history.

(56) References Cited

U.S. PATENT DOCUMENTS

| 7,062,011 | B1 | 6/2006 | Tybinkowski et al. |
| 7,614,788 | B2 | 11/2009 | Gatten |
| 8,462,206 | B1 | 6/2013 | McGuire et al. |
| 2007/0003009 | A1* | 1/2007 | Gray ...................... G01N 23/04 378/57 |
| 2007/0007339 | A1* | 1/2007 | Despres ................. A61B 50/13 235/385 |
| 2010/0078839 | A1 | 4/2010 | Simpson et al. |
| 2012/0160638 | A1 | 6/2012 | Baker et al. |
| 2015/0192690 | A1* | 7/2015 | Bridger ................ G01V 5/0016 378/57 |

OTHER PUBLICATIONS

International Search Report and the Written Opinion of the International Searching Authority for PCT Application No. PCT/US 18/17902, dated Apr. 27, 2018.

* cited by examiner

*Primary Examiner* — Dani Fox
(74) *Attorney, Agent, or Firm* — Armstrong Teasdale LLP

(57) ABSTRACT

An imaging system includes a conveyor duct including a first wall and an opposing second wall, a gantry coupled to one end of the conveyor duct, an imaging assembly associated with the gantry, and a conveyor assembly coupled to the conveyor duct. The conveyor assembly includes a first rail coupled to the first wall of the conveyor duct and a second rail coupled to the second wall of the conveyor duct, the first rail and the second rail defining a channel therebetween. The imaging system also includes a tray including a base, wherein the conveyor assembly is configured to transport the tray into the gantry, and wherein the base of the tray extends between and below the first rail and the second rail when the conveyor assembly is transporting the tray.

20 Claims, 5 Drawing Sheets

TRAY CONVEYOR BAGGAGE HANDLING AND IMAGING SYSTEM

BACKGROUND

The embodiments described herein relate generally to baggage handling systems, and more particularly, to a tray-conveyor baggage handling system including a conveyor configured to transport at least one tray with an object therein through an imaging gantry.

Known luggage scanning systems, such as explosives detection systems (EDS) that perform computed tomography (CT) scanning, are designed to scan a continuous stream of luggage and other objects to provide adequate throughput for travelers at an airport, for example. Baggage handling systems are designed to facilitate this stream of luggage, transporting luggage items throughout the airport. At least some baggage handling systems have been developed that use trays or totes to carry objects (e.g., luggage, bags, etc.). These systems facilitate more reliable bag tracking and enable faster transportation speeds within the system. Reliability and speed are important factors, particularly in medium and large sized airports, where bags often need to travel long distances and be transported between different locations within the airport.

However, in at least some known baggage handling systems, luggage is placed in trays that travel on top of a traditional conveyor belt. Such an arrangement significantly reduces a maximum size of luggage that can pass through a gantry of the EDS. Moreover, as a field of view (FOV) of the EDS is configured based upon the conveyor-belt surface, at least a portion of a large luggage item may therefore be outside of the FOV of the EDS when the large luggage item passes through the gantry in a tray on top of a conveyor belt. Accordingly, at least some luggage items may not be satisfactorily imaged.

SUMMARY

In one aspect, an imaging system is provided. The imaging system includes a conveyor duct including a first wall and an opposing second wall, a gantry coupled to one end of the conveyor duct, an imaging assembly associated with the gantry, and a conveyor assembly coupled to the conveyor duct. The conveyor assembly includes a first rail coupled to the first wall of the conveyor duct and a second rail coupled to the second wall of the conveyor duct, the first rail and the second rail defining a channel therebetween. The imaging system also includes a tray including a base, wherein the conveyor assembly is configured to transport the tray into the gantry, and wherein the base of the tray extends between and below the first rail and the second rail when the conveyor assembly is transporting the tray.

In another aspect, a conveyor system is provided. The conveyor system includes a conveyor duct including a first wall and an opposing second wall, a conveyor assembly coupled to the conveyor duct, and a tray. The conveyor assembly includes a first rail coupled to the first wall of the conveyor duct and a second rail coupled to the second wall of the conveyor duct, the first rail and the second rail defining a channel therebetween. The tray includes a base, wherein the conveyor assembly transports the tray, and wherein the base of the tray extends between and below the first rail and the second rail when the conveyor assembly is transporting the tray.

DETAILED DESCRIPTION

The imaging system described herein includes a gantry, an imaging assembly, and a conveyor assembly. The conveyor assembly is configured to transport objects (e.g., luggage items) through the gantry to be imaged by the imaging assembly. In the example embodiment, the conveyor assembly includes a conveyor configured to transport one or more trays on a pair of rails, such that the tray is positioned between and at least partially below the rails. This conveyor assembly facilitates transporting the objects through the field of view (FOV) of the imaging assembly. Accordingly, the imaging system described herein facilitates transportation of objects of increased size without sacrificing image quality thereof. The imaging system described herein may be implemented in, for example, a baggage handling system, a checkpoint system, a mail or package handling or sorting system, or any other such system.

Figure 1A:
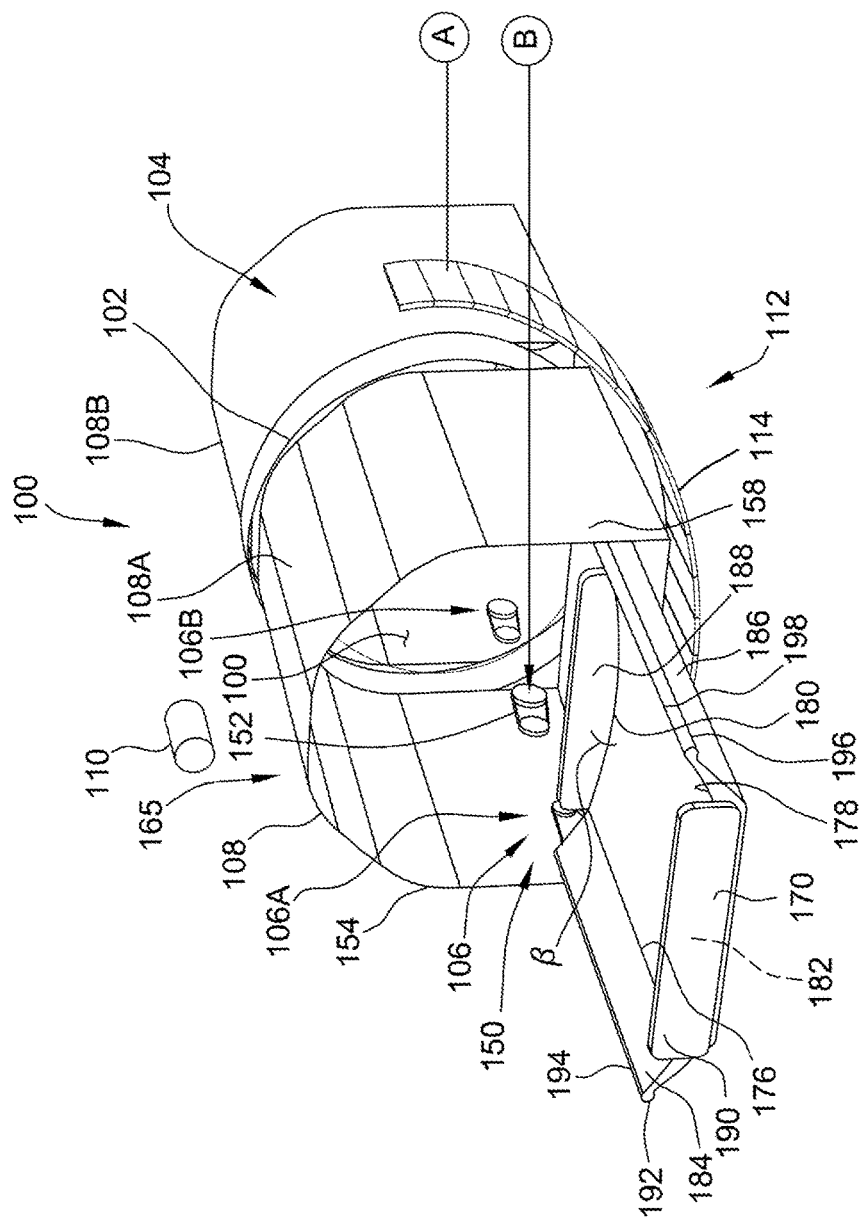
FIGS. 1A and 1B are a perspective view of one example embodiment of an imaging system in accordance with the present disclosure.
Figure 1B:
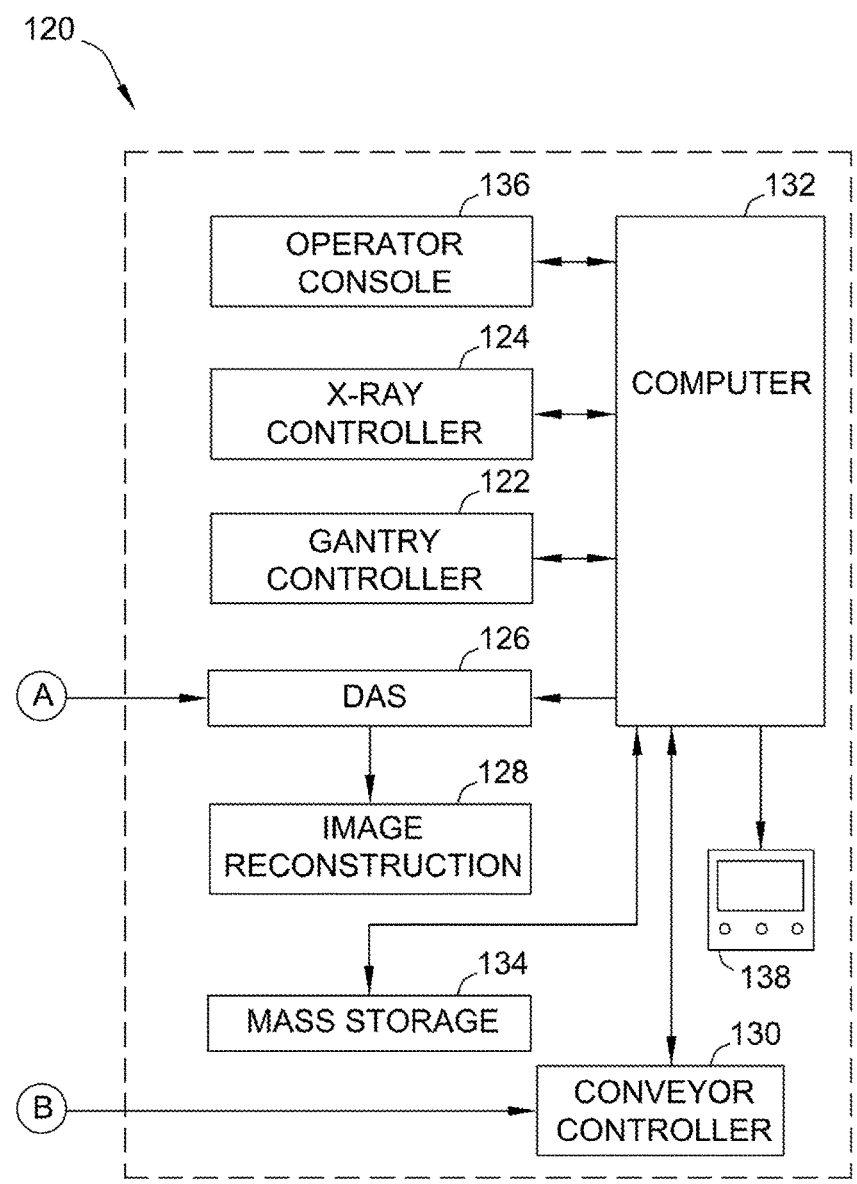

Turning now to the figures, FIGS. 1A and 1B illustrate one example embodiment of an imaging system 100 in accordance with the present disclosure. Imaging system 100 includes a gantry 102, an imaging assembly 104, and a conveyor assembly 106. Conveyor assembly 106 is configured to convey an object 140 (as shown in FIG. 2C), such as a piece of luggage, through gantry 102 to be imaged by imaging assembly 104. In the illustrated embodiment, imaging system 100 further includes a conveyor duct 108 on both an entrance side and an exit side of gantry 102. Conveyor assembly 106 is coupled to conveyor duct 108.

Imaging assembly 104 includes an x-ray source 110 on one side of gantry 102 that projects a fan beam of x-rays toward a detector array 112 on an opposite side of gantry 102. Detector array 112 is formed by detector elements 114, which are radiation detectors that each produce a signal having a magnitude that represents and is dependent on the intensity of the attenuated x-ray beam after it has passed through the object being imaged. During a helical scan that acquires x-ray projection data, gantry 102 along with the x-ray source 110 and detector array 112 rotate within an x-y plane and around the object about a center of rotation, while the object is moved through gantry 102 in a z-direction 118 perpendicular to the x-y plane of rotation. Gantry 102 and x-ray source 110 are controlled by a control system 120, which includes a gantry controller 122, an x-ray controller 124, a data acquisition system (DAS) 126, an image reconstructor 128, a conveyor controller 130, a computer 132, a mass storage system 134, an operator console 136, and a display device 138. Gantry controller 122 controls the rotational speed and position of gantry 102, while x-ray controller 124 provides power and timing signals to x-ray source 110, and DAS 126 acquires analog data from detector elements 114 and converts the data to digital form for subsequent processing. Image reconstructor 128 receives the digitized x-ray data from DAS 126 (or computer 132) and performs preprocessing steps on the digitized x-ray data and an image reconstruction process.

Figure 2A:
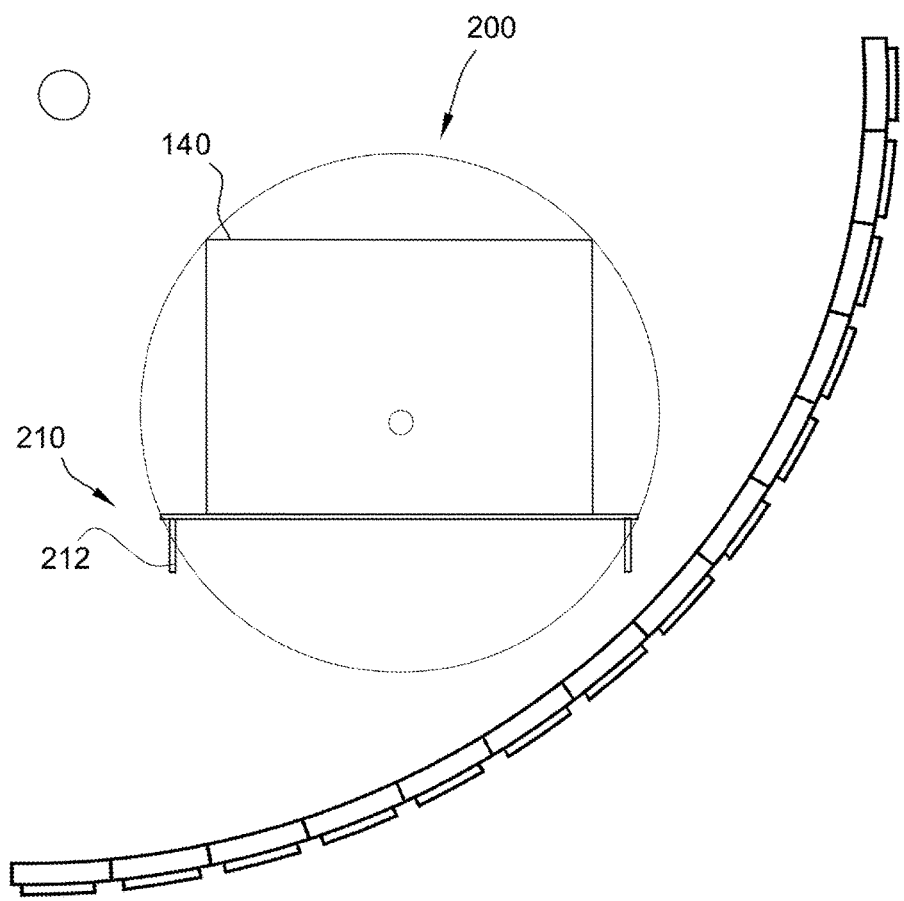
FIGS. 2A-2C are diagrams illustrating an object conveyed through a field of view (FOV) of the imaging system shown in FIG. 1 using various conveyor assemblies.
Figure 2B:
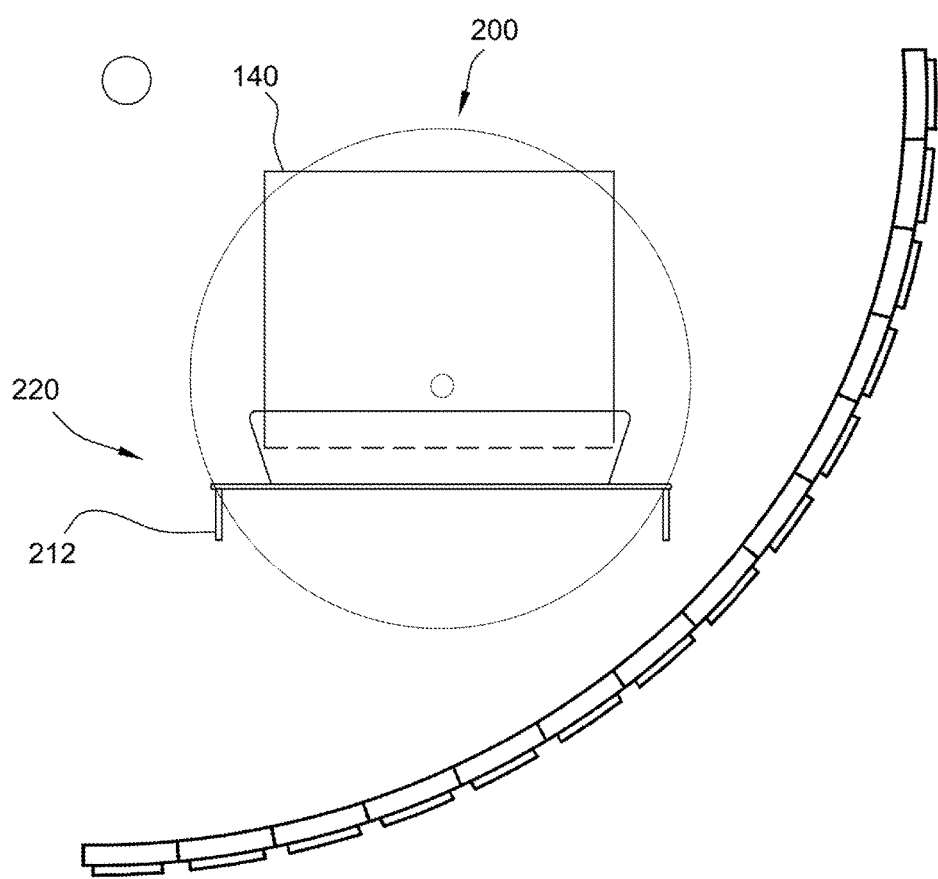
Figure 2C:
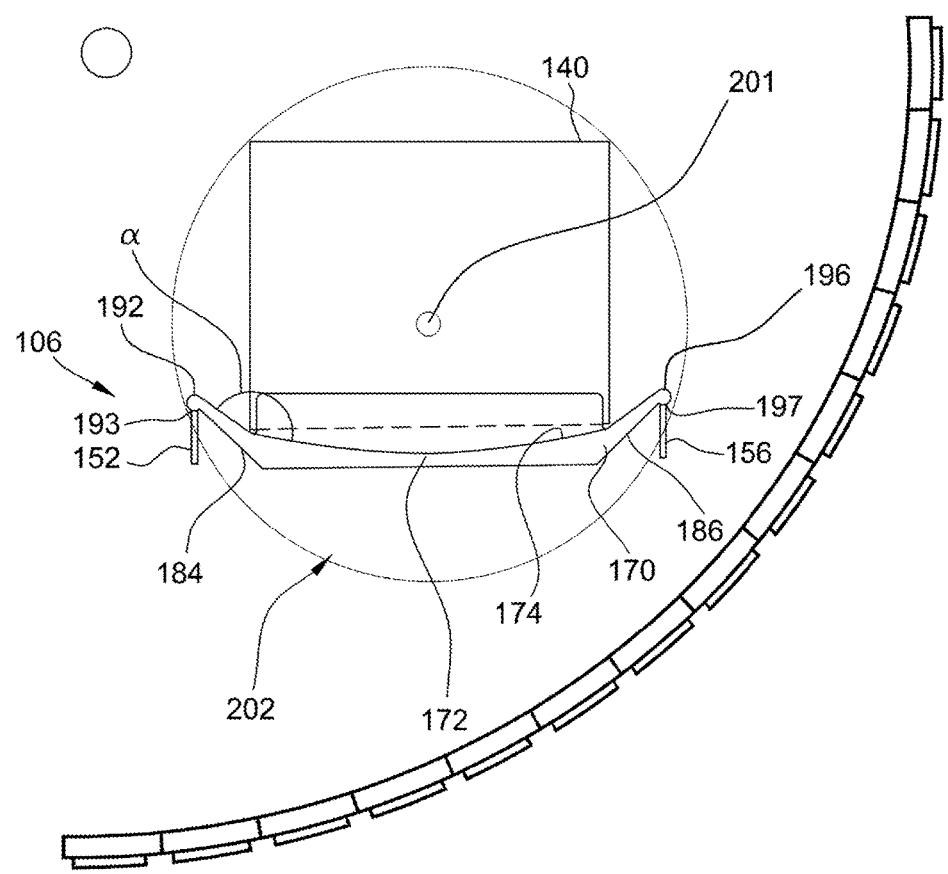

FIGS. 2A-2C are diagrams illustrating an object 140 conveyed through a field of view (FOV) 200 of imaging assembly 104 (shown in FIG. 1A). FOV 200 defines the area through which object 140 can travel and be imaged by imaging assembly 104. FOV 200 is predetermined based on the specific configuration of x-ray source 110 and detector array 112. Moreover, FOV 200 is configured based on the geometry of gantry 102, such that FOV 200 fits within the circumference of gantry 102, as shown in FIG. 1A. If a much larger FOV is desired, typically a larger diameter gantry 102 must be used.

FIG. 2A illustrates a known conveyor assembly 210 including a conveyor belt 212. Object 140 is placed on conveyor belt 212 and transported through FOV 200 of imaging assembly 104. Object 140 lies fully within FOV 200 and therefore may be fully imaged. However, conveyor assemblies 210 including "bare" conveyor belts 212 (i.e., objects 140 are placed directly on belts 212) have a disadvantage of low efficiency of tracking objects through a full baggage handling system (that includes conveyor assembly 210).

FIG. 2B illustrates another known conveyor assembly 220 that attempts to overcome the disadvantage of conveyor assembly 210 by placing object 140 within a tray 222 carried on conveyor belt 212. Trays 222 improve the efficiency of object tracking in conveyor assemblies 220. However, as illustrated, placing objects 140 in trays 222 on top of conveyor belts 212 causes a new disadvantage to arise—large objects 140 do not fully fit within FOV 200. In some cases, large objects 140 will not even fit within gantry 102, reducing the maximum size of objects 140 that can be imaged using imaging system 100.

FIG. 2C illustrates conveyor assembly 106 of imaging system 100. With reference to FIGS. 1A and 2C, conveyor assembly 106 does not include a belt 212 but instead includes a pair of rails 150 coupled to conveyor duct 108. More specifically, conveyor assembly 106 includes a first rail 152 coupled to a first side wall 154 of conveyor duct 108 and a second rail 156 coupled to a second side wall 158 of conveyor duct 108. As used herein, "rail" refers generally to structures suitable to convey (transport) a tray 170 as well as to support or retain trays 170 thereon. Accordingly, each "rail" 152, 156 need not be one singular component but can include a plurality of separate components that cooperate to convey and support trays 170. Rails 152, 156 can include continuous rails (e.g., belts) and/or separate rail components (e.g., as illustrated in FIG. 1A). As illustrated in FIG. 1A, each rail 152, 156 may include a plurality of pulley assemblies. In other embodiments, each rail 152, 156 may include one or more chain belts and sprocket assemblies, or one or more "mini" conveyor belts. In still other embodiments, each rail 152, 156 may include any other suitable conveying structure(s). Moreover, the space between rails 152, 156 is open, with rails 152, 156 defining an open or empty channel 160 such that rails 152, 156 transport trays 170 between rails 152, 156 (as opposed to transporting a tray 222 on top of a belt 212, as shown in FIG. 2B).

Accordingly, as shown in FIG. 2C, conveyor assembly 106 enables a base 172 of tray 170 to sit between and below rails 152, 156, such that objects 140 sit lower and can be fully imaged within FOV 200. In addition, base 172 of tray 170 is positioned within a bottom portion 202 of FOV 200, such that object 140 is lowered with respect to a center 201 of FOV. In some embodiments, objects 140 may be substantially centered within FOV 200. In this way, conveyor assembly 106 overcomes the disadvantages of conveyor assembly 210 (object tracking inefficiency) and conveyor assembly 220 (reduced maximum object size and/or incomplete imaging of large objects). Moreover, conveyor assembly 106 enables the imaging of larger objects 140 through a bore 103 defined by gantry 102 compared to conveyor assembly 210, and conveyor assembly 106 ensures complete imaging of objects 140 that would have portions thereof "cut-off" from FOV 200 when using conveyor assembly 220.

In the illustrated embodiment, imaging system 100 includes two conveyor ducts 108 and two conveyor assemblies 106 (collectively, "conveyor systems" 165). One "front" conveyor assembly 106A transports trays 170 through a first "front" conveyor duct 108A and into gantry 102, and another "rear" conveyor assembly 106B transports trays 170 out of gantry 102 and through a second "rear" conveyor duct 108B. In the example embodiment, conveyor controller 130 controls conveyor assemblies 106 to move at the same, constant speed for optimal imaging of object 140 by imaging assembly 104. Moreover, in the example embodiment, conveyor ducts 108 are straight, such that conveyor assemblies 106 do not require additional guidance systems to move trays 170 therethrough. In other embodiments, imaging system 100 may include fewer or more conveyor ducts 108 and conveyor assemblies 106. Additionally or alternatively, imaging system 100 may include otherwise configured conveyor systems 165 (e.g., conveyor systems 165 including much longer conveyor ducts than those illustrated in FIG. 1A).

Tray 170 includes base 172 configured to hold an object 140 thereon. Base 172 is illustrated as a concave base 172 having a curved, concave surface 174. In other embodiments, base 172 may be a flat base 172 having a substantially planar surface. Base 172 includes first and second side edges 176, 178 and first and second end edges 180, 182.

Tray 170 further includes two opposing side walls 184, 186 and two opposing ends walls 188, 190. Each side wall 184, 186 extends from a respective side edge 176, 178 of base 172. Likewise, each end wall 188, 190 extends from a respective end edge 180, 182 of base 172. Each side wall 184, 186 extends at an angle α from base 172. Angle α may measure between about 10° and about 170°, in various embodiments. In the illustrated embodiment, angle α measures between about 120° and about 150°, or about 135°. Each end wall 188, 190 extends at an angle β from base 180. Angle β may measure between about 0° and about 170°, in various embodiments. In the illustrated embodiment, angle β measures between about 80° and about 100°, or about 90°.

A first side wall 184 of side walls 184, 186 includes a first flange 192 extending from first side wall 184 along an edge 194 thereof opposite base 172. Similarly, a second side wall 186 of side walls 184, 186 includes a second flange 196 extending from second side wall 186 along an edge 198 thereof opposite base 172. First and second flanges 192, 196 are positioned atop respective rails 152, 156 when tray 170 is placed in conveyor assembly 106. Put another way, first rail 152 receives a bottom surface 193 of first flange 192, and second rail 156 receives a bottom surface 197 of second flange 196. Accordingly, as discussed above, when tray 170 is placed in conveyor assembly 106, base 172 extends between and below rails 152, 156 to position objects 140 lower, with respect to center 201 of FOV 200.

Exemplary embodiments of methods and systems are described above in detail. The methods and systems are not limited to the specific embodiments described herein, but rather, components of systems and/or steps of the methods may be used independently and separately from other components and/or steps described herein. Accordingly, the exemplary embodiment can be implemented and used in connection with many other applications not specifically described herein. For example, the above-described tray conveyor systems gantry resting on support wheels may be implemented in any suitable conveyor and/or imaging system.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An imaging system comprising:
   a conveyor duct comprising a first end, a second end, a first wall extending between said first and second ends, and an opposing second wall extending between said first and second ends;
   a gantry coupled to said second end of said conveyor duct;
   an imaging assembly associated with said gantry;
   a conveyor assembly coupled to said conveyor duct, said conveyor assembly comprising a first rail coupled to an interior surface of said first wall of said conveyor duct and a second rail coupled to an interior surface of said second wall of said conveyor duct, said first rail and said second rail defining a channel therebetween; and
   a tray comprising a base, wherein said conveyor assembly is configured to transport said tray into said gantry, and wherein a base of said tray extends between and below said first rail and said second rail when said conveyor assembly is transporting said tray.

2. The imaging system of claim 1, wherein said tray further comprises a first side wall extending from a first edge of said base, a second side wall extending from an opposing second edge of said base, a first flange extending outwards from said first side wall, and a second flange extending outwards from said second side wall.

3. The imaging system of claim 2, wherein said first rail of said conveyor assembly receives said first flange of said tray, and said second rail receives said second flange of said tray.

4. The imaging system of claim 2, wherein said first side wall and said second side wall of said tray extend from said base at an angle between approximately 10° and approximately 170°.

5. The imaging system of claim 1, wherein said first rail and said second rail each comprise at least one chain belt and at least one sprocket.

6. The imaging system of claim 1, wherein said imaging assembly comprises:
   an x-ray urce; and
   a plurality of detectors defining a field of view (FOV) of said imaging assembly,
   wherein said conveyor assembly is configured to transport said tray through the FOV of said imaging assembly.

7. The imaging system of claim 6, wherein said conveyor assembly is configured to transport said tray through said imaging assembly such that said base of said tray is positioned in a bottom portion of the FOV of said imaging assembly.

8. The imaging system of claim 6, wherein said gantry defines a bore, and wherein said tray is configured to contain an object having a predetermined size associated with the bore through the FOV of said imaging assembly.

9. A conveyor system comprising:
   a conveyor duct comprising a first end, a second end, a first wall extending between said first and second ends, and an opposing second wall extending between said first and second ends;
   a gantry coupled to said second end of said conveyor duct;
   a conveyor assembly coupled to said conveyor duct, said conveyor assembly comprising a first rail coupled to an interior surface of said first wall of said conveyor duct and a second rail coupled to an interior surface of said second wall of said conveyor duct, said first rail and said second rail defining a channel therebetween; and
   a tray comprising a base, wherein said conveyor assembly is configured to transport said tray into said gantry, and wherein said base of said tray extends between and below said first rail and said second rail when said conveyor assembly is transporting said tray.

10. The conveyor system of claim 9, wherein said tray further comprises a first side wall extending from a first edge of said base, a second side wall extending from an opposing second edge of said base, a first flange extending outwards from said first side wall, and a second flange extending outwards from said second side wall.

11. The conveyor system of claim 10, wherein said first rail of said conveyor assembly receives said first flange of said tray, and said second rail receives said second flange of said tray.

12. The conveyor system of claim 11, wherein said first flange rests on top of said first rail, and said second flange rests on top of said second rail.

13. The conveyor system of claim 10, wherein said first side wall and said second side wall of said tray extend from said base at an angle between approximately 10° and approximately 170°.

14. The conveyor system of claim 9, wherein said first rail and said second rail each comprise at least one belt and at least one pulley.

15. The conveyor system of claim 9, wherein said first rail and said second rail each comprise at least one chain belt and at least one sprocket.

16. A method of operating an imaging system, the imaging system including a conveyor duct including a first end, a second end, a first wall extending between said first and second ends, and an opposing second wall extending between said first and second ends, a gantry coupled to the second end of the conveyor duct, an imaging assembly associated with the gantry, and a conveyor assembly coupled to the conveyor duct, the conveyor assembly including a first rail coupled to an interior surface of the first wall of the conveyor duct and a second rail coupled to an interior surface of the second wall of the conveyor duct, the first rail and the second rail defining a channel therebetween, said method comprising:
   placing an object within the tray, wherein said placing positions a base of the tray between and below the first rail and the second rail and between the first wall interior surface and the second wall interior surface;

activating the conveyor assembly to transport the tray into the gantry; and imaging the object within the tray using the imaging assembly.

17. The method of claim 16, wherein the tray includes a first side wall extending from a first edge of the base, a second side wall extending from an opposing second edge of the base, a first flange extending outwards from the first side wall, and a second flange extending outwards from the second side wall, wherein said placing comprises resting the first flange on top of the first rail of the conveyor assembly and resting the second flange on top of the second rail of the conveyor assembly.

18. The method of claim 16, wherein the imaging assembly includes an x-ray source, and a plurality of detectors defining a field of view (FOV) of the imaging assembly, wherein said activating the conveyor assembly comprises activating the conveyor assembly to transport the tray through the FOV of the imaging assembly.

19. The imaging system of claim 1, wherein said conveyor duct comprises a first conveyor duct, and wherein said imaging system further comprises:

a second conveyor duct comprising a third wall and an opposing fourth wall, wherein said gantry is positioned between said first conveyor duct and said second conveyor duct, wherein said conveyor assembly further comprises a third rail coupled to an interior surface of said third wall and a fourth rail coupled to an interior surface of said fourth wall, wherein the base of said tray extends between and below said third rail and said fourth rail when said tray enters said gantry, and wherein the base of said tray extends between and below said first rail and said second rail when said tray exits said gantry.

20. The imaging system of claim 19, wherein said gantry is rotatable relative to said first and second conveyor ducts and said first, second, third, and fourth rails.

* * * * *